United States Patent [19]
Saxe

[11] Patent Number: 5,309,544
[45] Date of Patent: May 3, 1994

[54] LIGHT PIPE HAVING OPTIMIZED CROSS-SECTION

[75] Inventor: Steven G. Saxe, St. Paul, Minn.

[73] Assignee: Minnesota Mining and Manufacturing Company, Saint Paul, Minn.

[21] Appl. No.: 861,243

[22] Filed: Mar. 31, 1992

[51] Int. Cl.$^5$ .............................................. G02B 6/00
[52] U.S. Cl. .................... 385/146; 385/147; 385/901
[58] Field of Search ............... 385/146, 147, 133, 901

[56] References Cited

U.S. PATENT DOCUMENTS

| | | | |
|---|---|---|---|
| 4,260,220 | 4/1981 | Whitehead | 350/96.28 |
| 4,615,579 | 10/1986 | Whitehead | 350/96.1 |
| 4,709,304 | 11/1987 | Mori | 385/147 |
| 4,740,048 | 4/1988 | Mori | 385/147 |
| 4,750,798 | 6/1988 | Whitehead | 350/96.10 |
| 4,787,708 | 11/1988 | Whitehead | 350/96.28 |
| 4,791,540 | 12/1988 | Dreyer, Jr. et al. | 362/331 |
| 4,805,984 | 2/1989 | Cobb, Jr. | 350/96.28 |
| 4,834,495 | 5/1989 | Whitehead et al. | 350/96.28 |
| 4,850,665 | 7/1989 | Whitehead | 350/96.10 |
| 4,906,070 | 3/1990 | Cobb, Jr. | 350/286 |
| 4,912,605 | 3/1990 | Whitehead | 362/32 |
| 4,941,074 | 7/1990 | DeCosse et al. | 362/61 |
| 4,996,632 | 2/1991 | Aikens | 362/32 |
| 5,016,143 | 5/1991 | Aikens | 362/32 |
| 5,040,883 | 8/1991 | Cobb, Jr. | 350/452 |
| 5,043,850 | 8/1991 | Dreyer, Jr. | 362/26 |
| 5,056,892 | 10/1991 | Cobb, Jr. | 359/831 |
| 5,095,415 | 3/1992 | Anderson et al. | 362/329 |

*Primary Examiner*—Rodney B. Bovernick
*Assistant Examiner*—Stephen W. Barns
*Attorney, Agent, or Firm*—Gary L. Griswold; Walter N. Kirn; Stephen W. Buckingham

[57] ABSTRACT

A luminaire includes a light pipe having an optical axis. The light pipe includes a tube with a structured outer surface and a smooth inner surface. A reflective light extractor is positioned in the tube such that light reflected by the extractor will strike the tube on a first side. The first side has a contour such that the direction of travel of light reflected by the extractor will have a projection in the plane perpendicular to the optical axis that makes a predetermined angle with the smooth surface.

7 Claims, 4 Drawing Sheets

5,309,544

LIGHT PIPE HAVING OPTIMIZED CROSS-SECTION

BACKGROUND OF THE INVENTION

Light conduits, also known as light pipes, formed of structured surface materials and operating on the basis of total internal reflection are well-known. Such light conduits are described in U.S. Pat. No. 4,260,220 (Whitehead). As described in that patent, the light conduit is used primarily for transporting light. Alternatively, such a light conduit may be used as a lighting fixture or luminaire as described in U.S. Pat. No. 4,615,579 (Whitehead). Such a luminaire has the advantage that it provides even illumination over an extended region.

All of the light conduits described in the Whitehead references mentioned above, have flat sides. Experimentation has shown, however, that the transport efficiency of a light conduit having curved sides, and in particular a round cross-section, is, in general, better than that of such a pipe having flat sides. Such a light pipe is described in U.S. Pat. No. 4,805,984 (Cobb).

It is often desirable to use an extractor to help force light out of the tube forming the light conduit. This is particularly true when the light conduit is to be used as a luminaire. U.S. Pat. No. 4,850,665 (Whitehead) describes such an extractor. A preferred material for the extractor of that patent is a nonwoven polyester fiber formed into a sheet such as that sold under the registered trademark Tyvek by E. I. DuPont de Nemours and Company.

There are two related disadvantages that arise when light conduits such as those described in the above referenced patents are used as luminaires. Both problems result from the fact that these systems make no attempt to control the angle at which light escaping the tube strikes the smooth inner surface of the tube. The first problem relates to the efficiency of luminaires such as those described in the references discussed above. Experimentation and computer simulations have shown that light escapes the wall of the tube most efficiently when the projection of the direction of travel of the light ray in the plane perpendicular to the axis of the light pipe forms an angle of approximately 60 degrees with the normal to the smooth inner surface of the tube. In this context the phrase "most efficient" means that the highest percentage of the light striking the surface is transmitted and escapes from the light pipe. Since the prior art luminaires do not control the angle at which the light strikes the tube, they do not insure maximum efficiency.

The second problem is closely related to the first. Since the prior art systems do not control the angles at which the light strikes the inner surface of the tube, they tend to produce diffuse or otherwise uncontrolled light output. While this works well for some circumstances, it is not acceptable in situations where a strongly directed beam of light is desired.

SUMMARY OF THE INVENTION

In the present invention a luminaire includes a light pipe having an optical axis. The light pipe includes a tube with a structured outer surface and a smooth inner surface. A reflective light extractor is positioned in the tube such that light reflected by the extractor will strike the tube on a first side. The first side has a contour such that the direction of travel of light reflected by the extractor will have a projection in the plane perpendicular to the optical axis that makes a predetermined angle with the smooth surface.

DETAILED DESCRIPTION OF A PREFERRED EMBODIMENT

Figure 1:
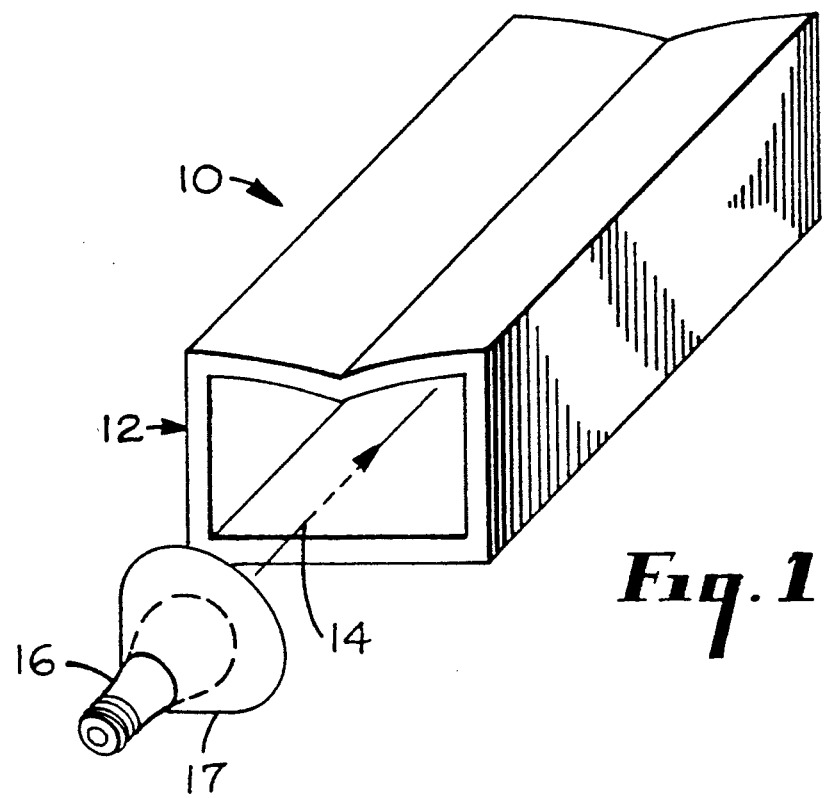
FIG. 1 is a perspective view of a light fixture according to the invention.

FIG. 1 illustrates a light pipe 10 according to the invention. Light fixture 10 includes a light pipe housing 12 having an optical axis 14 and a light source 16. Light source 16 is provided with a preferably parabolic, reflector 17. Reflector 17 is used because a light pipe such as light pipe 12 only transports light efficiently if the input light is at least partially collimated. Light from the light source 16 will be transported in light pipe 10 generally along optical axis 14. As used herein, the phrase "generally along the optical axis" means that the light will not necessarily actually travel parallel to the optical axis, but confinement to light pipe housing 12 will cause the light to advance along the axis.

Figure 2:
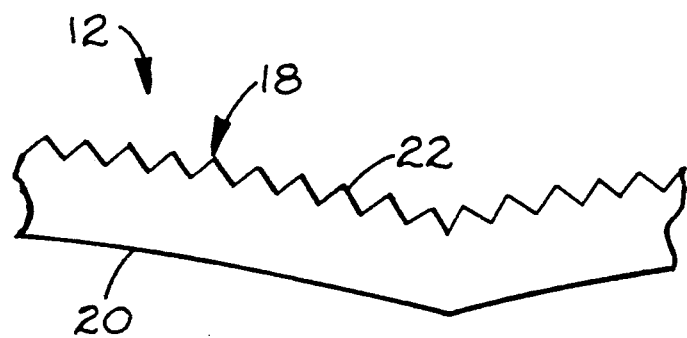
FIG. 2 is an enlarged view of a portion of a light pipe useable in the invention.

FIG. 2 shows an enlarged view of a portion of light pipe 12. As shown in FIG. 2 light pipe 12 has a structured outer surface 18 and a smooth inner surface 20. Structured surface 18 has a plurality of prisms, such as prism 22, formed thereon. Those prisms are preferably linear and substantially right angled isosceles prisms and have axes running parallel to axis 14 of the light pipe. Light pipe 12 could be of any transparent material. Preferably light pipe 12 is of a transparent polymer such as an acrylic or polycarbonate. A film that is available from Minnesota Mining and Manufacturing Company under the name 3M Optical Lighting Film may be used to make light pipe 12.

Figure 3:
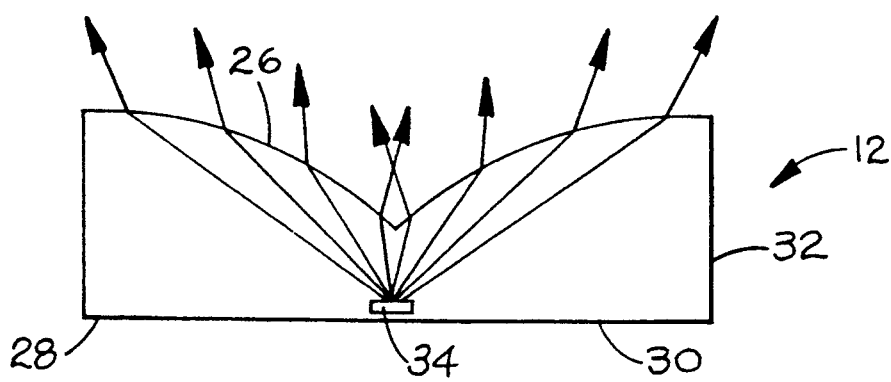
FIG. 3 is a schematic cross section of a first embodiment of a light fixture according to the invention.

FIG. 3 is an end view of light pipe 12. As may be seen in FIG. 3, light pipe 12 has a curved light emitting side 26 and straight rectangular light reflecting sides 28, 30, and 32. It should be noted that, in the preferred embodiment, sides 26, 28, 30, and 32 are all of the same structured surface material as shown in FIG. 2. The fact that side 26 is light transmitting and sides 28, 30, and 32 are light reflecting arises from the angle at which light strikes those sides. This is because light that strikes the smooth side of a structured surface film such as 3M Optical Lighting Film will be transmitted or reflected by the structured side depending on the angle of entry.

Figure 4:
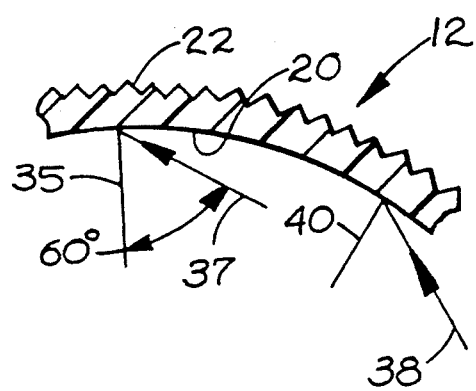
FIG. 4 is an enlargement of a portion of the light fixture of FIG. 3.

The light pipe of FIG. 3 further includes an extractor 34. As described above, extractor 34 is preferably of a diffusely reflective dielectric material such as a nonwoven polyester mat. Extractor 34 reflects light in all directions, but especially toward the transmission side 26. The curve of transmissive side 26 is designed so that light coming from extractor 34 will strike side 26 such that the projection of the direction of travel of each light ray in the plane perpendicular to light pipe axis 14 will make an angle of about 60 degrees with the normal to the smooth inner surface 20 of FIG. 2 at the point of intersection. This may be seen more clearly in FIG. 4. A normal 35 is drawn to surface 20. The projection of the direction of travel of a light ray 37 in the plane perpendicular to the axis of the light pipe strikes surface 20 at an angle of about 60 degrees to normal 35. Similarly, the projection of the direction of travel of light ray 38 strikes surface 20 at an angle of 60 degrees to normal 40.

It should be noted that the criteria described above will only be truly optimized for light actually traveling in the plane perpendicular to the axis of the conduit. However, the performance will be very close to optimum for light traveling at angles as great as 30 degrees or more to that plane.

Figure 5:
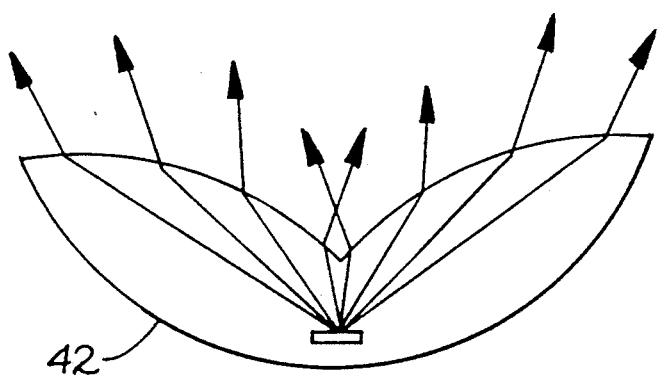
FIG. 5 is a schematic cross section of a second embodiment of a light fixture according to the invention.

FIG. 5 illustrates an embodiment of the invention similar to that of FIG. 3, except that the rectangular light conduit formed by sides 28, 30, and 32 is replaced by a curved light conduit formed by side 42. Under normal circumstances, the curved side of the embodiment of FIG. 5 would be expected to provide more efficient light transport, i.e., allow less of the light to leak out, than would the rectangular sides of the embodiment of FIG. 3.

Figure 6:
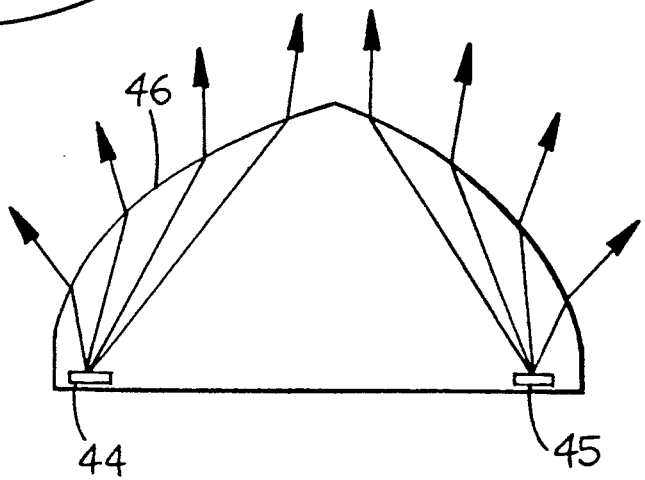
FIG. 6 is a schematic cross section of a third embodiment of a light fixture according to the invention.

FIG. 6 illustrates another alternative embodiment that is again similar to those of FIGS. 3 and 5, but utilizing two extractors 44 and 45. The light emitting side 46 is shaped such that light reflected by extractor 44 will strike the smooth surface of side 46 at an angle such that the projection of that light ray in the plane perpendicular to the optical axis of the light pipe makes an angle of about 60 degrees with the normal to the smooth inner surface of the light pipe at the point of intersection.

Figure 7:
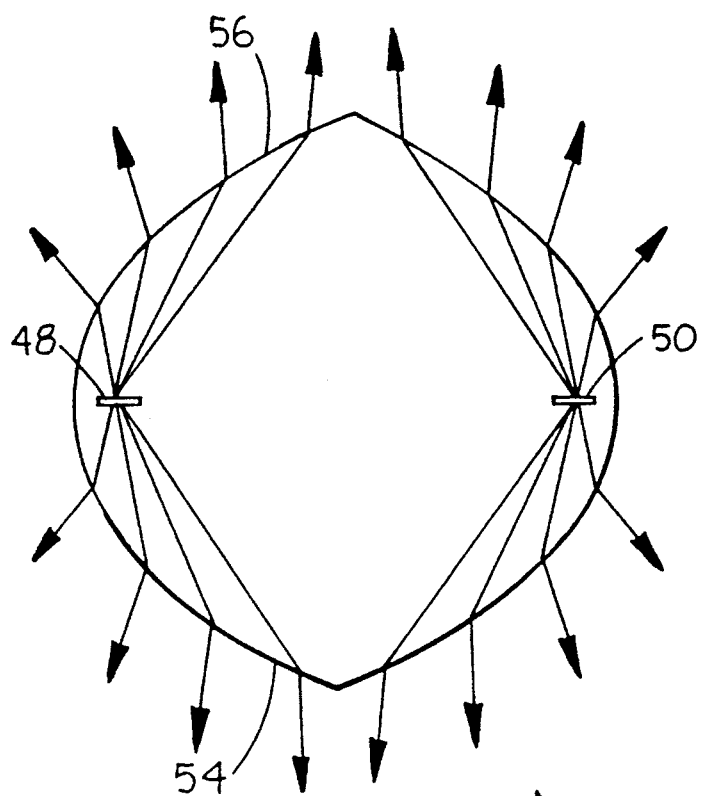
FIG. 7 is a schematic cross section of a fourth embodiment of a light fixture according to the invention.

FIG. 7 illustrates an embodiment of the invention having two extractors 48 and 50 and two opposing emitting surfaces 54 and 56. In each case the light is again reflected in a direction such that it strikes the smooth surface of the film on each exit side in a direction such that the projection of the light ray in the plane perpendicular to the optical axis of the tube makes an angle of approximately 60 degrees with the normal to the smooth side.

Figure 8:
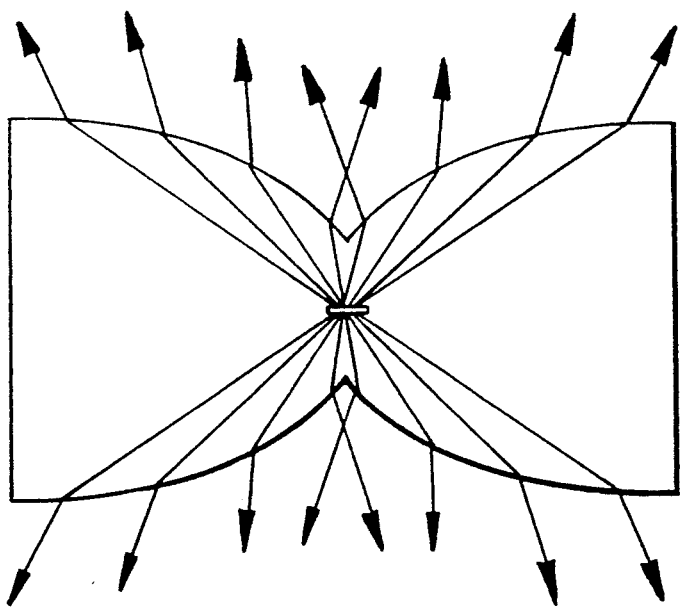
FIG. 8 is a schematic cross section of a fifth embodiment of a light fixture according to the invention.

FIG. 8 shows another alternative embodiment of the invention utilizing a single extractor 58 to cause light to be emitted from both sides of a light fixture. The light fixture of FIG. 8 also illustrates that it is possible to provide a reasonably highly directed beam of light, even though the fixture is optimized for transmission efficiency. The term "highly directed" is used here because, due to the structures on the outer surface of exit side 62, the light will not be completely collimated even in the plane perpendicular to the optic axis of the light pipe. This design will not, of course, affect the collimation, or lack thereof, in a plane parallel to the optic axis. Such a design will, however, provide a larger percentage of the light output in a small angular region.

Thus, a more directed output may be achieved. An even more highly directed beam may be produced by compromising the transmission efficiency.

Figure 9:
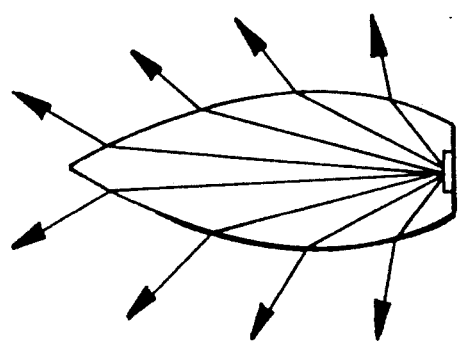
FIG. 9 is a schematic cross section of a sixth embodiment of a light fixture according to the invention.

FIG. 9 shows another embodiment of the invention. In the embodiment of FIG. 9 a single extractor is used to provide light output in a wide variety of directions.

Figure 10:
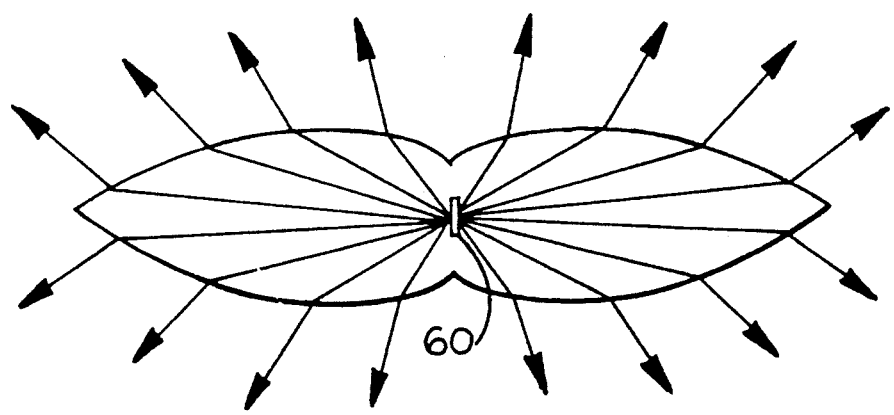
FIG. 10 is a schematic cross section of a seventh embodiment of a light fixture according to the invention.

FIG. 10 is an embodiment similar to that of FIG. 9 except that light is reflected from both sides of extractor 60. In that way light is reflected to transmission areas on both sides of the light pipe.

Figure 11:
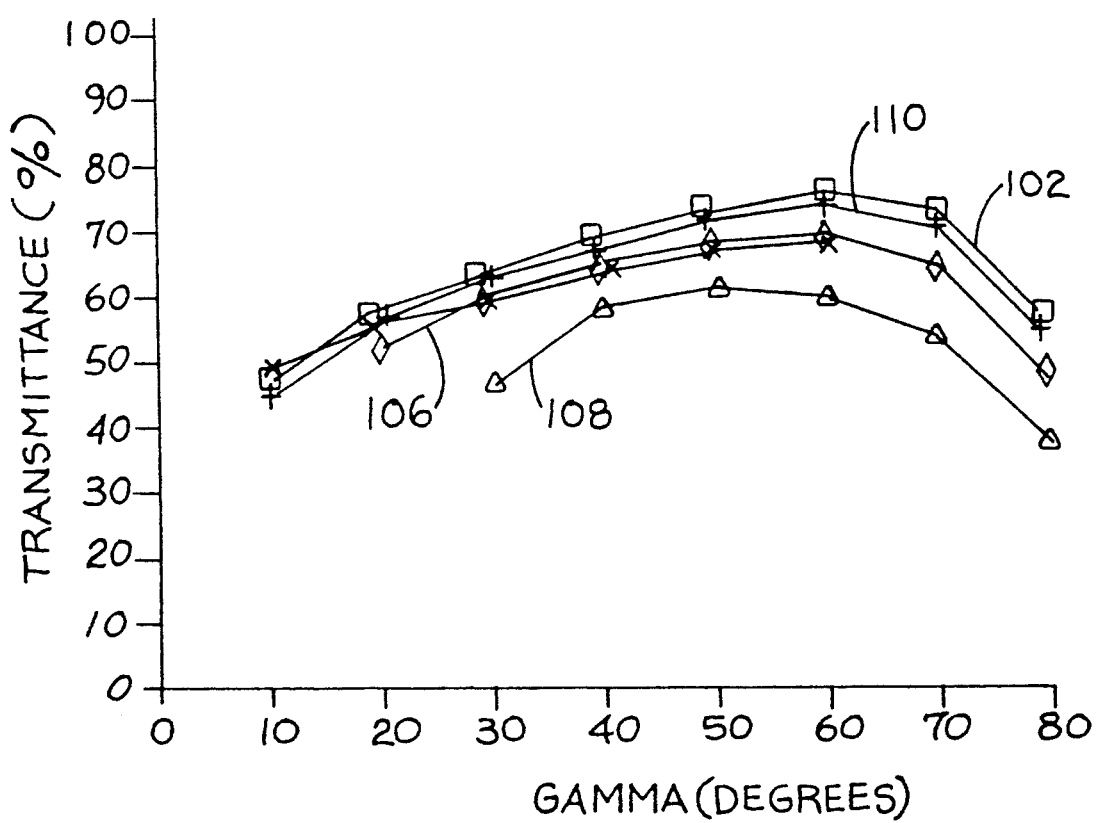
FIG. 11 is a graph showing the percentage transmission of light through the wall of a light pipe as a function of the angle at which the light strikes the wall.

FIG. 11 is a graph showing the expected percentage of light that would be transmitted out of a light pipe as a function of the angle made by the projection of the direction of travel of the light in the plane perpendicular to the axis of the light fixture with the normal to the smooth inner surface of the light fixture. Curves 102, 104, 106, and 108 show the expected percentages of light that would be transmitted out of the light pipe for light traveling in the plane perpendicular to the axis of the light pipe and at angles of 15 degrees, 30 degrees, and 45 degrees to that plane, respectively. As may be seen, performance, even at 30 degrees out of the plane, remains relatively consistent and peaks at about 60 degrees. Only curve 108, representing a light ray traveling at an angle of 45 degrees to the plane perpendicular to the axis of the light pipe, shows a significant drop off in transmittance compared with the other curves. Based on these curves, any angle in the range of 30 to 75 degrees will give acceptable performance and angles in the range of 50 to seventy degrees will provide very good performance.

Curve 110 of FIG. 11 shows the actual measured transmittance of light traveling in the plane perpendicular to the axis of the light fixture. As may be seen the actual measurements track very closely with those predicted.

What is claimed is:

1. A luminaire comprising a light pipe, said light pipe comprising a tube having an optical axis and a structured outer surface and a smooth inner surface and a reflective light extractor inside said tube, said extractor being positioned within said tube such that light propagating in said tube in a direction generally along said optical axis and striking said extractor will be reflected in a direction such that it will strike said tube on a first side thereof, said first side of said tube having a contour such that said direction of reflected light will have a projection in a plane perpendicular to said optical axis that makes a predetermined angle with said smooth surface.

2. A luminaire according to claim 1 wherein the contour of said first side is such that said light propagating said tube generally along said optical axis and reflecting from said extractor will be reflected in a direction within a range such that a projection of said direction in a plane perpendicular to said optical axis will strike said smooth surface at an angle to a normal to said smooth surface in the range of 30 degrees to 75 degrees.

3. A luminaire according to claim 2 wherein the contour of said first side is such that said light propagating said tube generally along said optical axis and reflecting from said extractor will be reflected in a direction within a range such that a projection of said direction in a plane perpendicular to said optical axis will strike said smooth surface at an angle to a normal to said smooth surface in the range of 50 degrees to 70 degrees.

4. A luminaire according to claim 3 wherein said angle is approximately 60 degrees.

5. A luminaire according to claim 2 wherein said structured outer surface comprises a plurality of triangular prisms, each prism having an axis running parallel to said optical axis.

6. A luminaire according to claim 5 wherein said prisms are right isosceles prisms.

7. A luminaire according to claim 6 wherein said angle is approximately equal to 60 degrees.

* * * * *